(12) United States Patent
Shahabuddin et al.

(10) Patent No.: US 10,284,376 B2
(45) Date of Patent: May 7, 2019

(54) CODE SIGNING SYSTEM WITH MACHINE TO MACHINE INTERACTION

(71) Applicant: ARRIS Enterprises LLC, Suwanee, GA (US)

(72) Inventors: Reshma T. Shahabuddin, Poway, CA (US); Ting Yao, San Diego, CA (US); Tat Keung Chan, San Diego, CA (US); Alexander Medvinsky, San Diego, CA (US); Xin Qiu, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 10 days.

(21) Appl. No.: 15/179,624

(22) Filed: Jun. 10, 2016

(65) Prior Publication Data

US 2016/0365983 A1 Dec. 15, 2016

Related U.S. Application Data

(60) Provisional application No. 62/173,604, filed on Jun. 10, 2015, provisional application No. 62/173,616, filed on Jun. 10, 2015.

(51) Int. Cl.
*H04L 9/32* (2006.01)
*H04L 9/30* (2006.01)
*H04L 9/14* (2006.01)
*H04L 29/06* (2006.01)
*G06F 16/9535* (2019.01)
(Continued)

(52) U.S. Cl.
CPC ........ *H04L 9/3249* (2013.01); *G06F 16/9535* (2019.01); *G06F 21/57* (2013.01); *G06F 21/645* (2013.01); *H04L 9/14* (2013.01); *H04L 9/302* (2013.01); *H04L 9/3268* (2013.01);
(Continued)

(58) Field of Classification Search
None
See application file for complete search history.

(56) References Cited

U.S. PATENT DOCUMENTS 8,266,684 B2    9/2012  Kline et al.
8,955,084 B2 *  2/2015  Do ..................... G06F 21/33
                                                  713/158

(Continued)

FOREIGN PATENT DOCUMENTS

WO       02/48848 A2    6/2002

OTHER PUBLICATIONS

PCT Search Report & Written Opinion, RE: Application No. PCT/US2016/037057, dated Sep. 6, 2016.

*Primary Examiner* — Kaveh Abrishamkar
(74) *Attorney, Agent, or Firm* — Thomas A. Ward

(57) ABSTRACT

A code signing system operating a web portal for user clients and a web service for automated machine clients. The web service can receive an operation request from a code signing module running on a remote machine client, the operation request including a request for a cryptographic operation and user credentials retrieved from a hardware cryptographic token connected to the machine client. The code signing system can perform the requested cryptographic operation and return a result to the machine client if the code signing system authenticates the machine client and the requested cryptographic operation is within a permissions set associated with the machine client.

12 Claims, 12 Drawing Sheets

(51) Int. Cl.
   *G06F 21/57*   (2013.01)
   *G06F 21/64*   (2013.01)
(52) U.S. Cl.
   CPC .......... *H04L 63/06* (2013.01); *H04L 63/0823* (2013.01); *H04L 63/101* (2013.01)

(56) References Cited

U.S. PATENT DOCUMENTS

| | | | |
|---|---|---|---|
| 9,219,611 B1* | 12/2015 | Naik | H04L 9/3247 |
| 2003/0065731 A1* | 4/2003 | Mohammed | G06F 21/33 |
| | | | 709/208 |
| 2006/0080535 A1* | 4/2006 | Elazar | G06F 21/10 |
| | | | 713/176 |
| 2007/0074031 A1* | 3/2007 | Adams | G06F 21/629 |
| | | | 713/176 |
| 2012/0213370 A1 | 8/2012 | Moskovics et al. | |
| 2014/0139318 A1* | 5/2014 | Malpani | G06F 21/32 |
| | | | 340/5.82 |
| 2015/0113275 A1 | 4/2015 | Kim et al. | |

\* cited by examiner

CODE SIGNING SYSTEM WITH MACHINE TO MACHINE INTERACTION

CLAIM OF PRIORITY

This application claims priority under 35 U.S.C. § 119(e) from earlier filed U.S. Provisional Application Ser. No. 62/173,604, filed Jun. 10, 2015, and earlier filed U.S. Provisional Application Ser. No. 62/173,616, filed Jun. 10, 2015, both of which are hereby incorporated by reference.

TECHNICAL FIELD

The present disclosure relates to the field of code signing and other cryptographic and/or digital security operations, particularly a system and method for automated client machines to interact with a code signing system.

BACKGROUND

Many modern electronic devices, such as mobile phones, cable boxes and other set-top boxes, cable modems, and other devices, are computing devices that perform operations based on software and/or firmware loaded on the device. To prevent malicious code from being run on such devices, authorized code is often digitally signed and/or encrypted before it is loaded onto devices.

Most conventional processes for requesting signing of code images, or requesting performance of other cryptographic and/or digital security operations, require human interaction. For example, when a new code image is compiled, a human user normally needs to log into a separate code signing system, input instructions to transfer the new unsigned code image to the code signing system, and manually request that the code signing system sign the unsigned code image and return a signed version of the code image.

Such systems can cause delay, as human users need to manually request code signing before a signed code image can be generated and loaded onto a device. Code images are often compiled and built automatically at build machines, but there is generally a delay between production of the code image and the time when a human user can request that the code image be signed by the code signing system.

Even if existing systems can be set up to automatically build and submit code images to be signed, there can be a lack of accountability in many such systems. When code signing is requested manually, a user generally needs to log in with his or her user credentials, and the system can track information such as which user logged in, at what time, and what code they submitted for signing. However, many automated systems do not necessarily track this type of information when build servers or other equipment automatically submit code images for signing.

In automated signing systems, if a code image is compiled, submitted, and signed automatically, but is later discovered after signing to have security vulnerabilities, it can be difficult to track down which user introduced the security vulnerabilities since the compiling and signing process proceeded on an automated basis without direct human instruction. For instance, a code image could be compiled and signed automatically, and then loaded onto a target device. It may be discovered at a later time that the code image intentionally or unintentionally allows users to access cryptographic keys and certificates on the target device, such as DTPC-IP keys or other copy protection keys, in violation of licenses or other legal agreements. Because the code compilation and signing occurred automatically without direct human instruction, it can be difficult or impossible in many systems to determine how and/or when the security vulnerabilities were introduced to the code image.

What is needed is a code signing system through which build machines or other equipment can automatically request code signing and other cryptographic and/or digital security operations from the code signing system, without direct human involvement during the request process. The build machine and/or other equipment that submits code to be signed should be configured to maintain audit logs about its process for later reference.

SUMMARY

The present disclosure provides a code signing system, the code signing system comprising a frontend server operating a web service configured to exchange data automatically over a network with a code signing module running on a remote machine client, and a web portal configured to exchange data over the network with a manually operated user client; and a backend server in data communication with the frontend server, the backend server being in data communication with a permissions database, the permissions database storing permission sets associated with authorized users, wherein the frontend server is configured to receive an operation request from the code signing module that comprises a request for a cryptographic operation and user credentials retrieved by the code signing module from a hardware cryptographic token connected to the machine client, wherein the frontend server is configured to authenticate the machine client as an authorized user based at least in part on the user credentials received from the code signing module, and wherein the backend server is configured to perform the cryptographic operation requested in the operation request and return a result of the cryptographic operation to the machine client via the frontend server when the frontend server authenticates the machine client as an authorized user and the cryptographic operation is within a permission set associated with the machine client in the permissions database.

The present disclosure also provides a method of performing remotely requested cryptographic operations, the method comprising providing a code signing system comprising a frontend server and a backend server, wherein the frontend server runs a web portal configured to exchange data with manually operated user clients and a web service configured to exchange data automatically with remote machine clients; receiving an operation request at the frontend server via the web service from a code signing module running on a remote machine client, the operation request comprising a request for a cryptographic operation, an IP address associated with the machine client, and a password decrypted from an encrypted password by the code signing module using a digital key stored on a hardware cryptographic token connected to the machine client; passing the IP address from the frontend server to the backend server and retrieving a permissions set associated with the IP address from a permissions database at the backend server; performing the cryptographic operation at the backend server when the cryptographic operation is within the permissions set; returning a result of the cryptographic operation from the backend server to the frontend server; and returning the result from the frontend server to the code signing module on the machine client via the web service.

The present disclosure also provides a method of performing remotely requested cryptographic operations, the method comprising providing a code signing system comprising a frontend server and a backend server, wherein the frontend server runs a web portal configured to exchange data with manually operated user clients and a web service configured to exchange data automatically with remote machine clients; receiving an operation request at the web server from a code signing module running on a remote machine client, the operation request comprising a request for a cryptographic operation; receiving a digital certificate at the web server from the code signing module, the digital certificate comprising an IP address associated with the machine client; authorizing the machine client as an authorized user based at least in part by verifying that the digital certificate does not appear on a certificate revocation list; passing the IP address from the frontend server to the backend server and retrieving a permissions set associated with the IP address from a permissions database at the backend server; performing the cryptographic operation at the backend server when the cryptographic operation is within the permissions set; returning a result of the cryptographic operation from the backend server to the frontend server; and returning the result from the frontend server to the code signing module via the web service.

BRIEF DESCRIPTION OF THE DRAWINGS

Further details of the present invention are explained with the help of the attached drawings in which.

DETAILED DESCRIPTION

Figure 1:
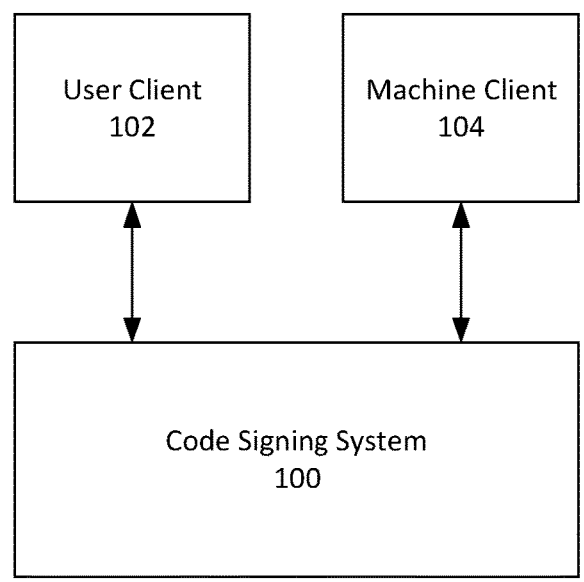
FIG. 1 depicts an exemplary operating environment for a code signing system.

FIG. 1 depicts an exemplary operating environment for a code signing system 100. A code signing system 100 can be configured to perform one or more cryptographic and/or digital security operations, such as generating digital signatures, encrypting code, and/or decrypting code. A code signing system 100 can be configured to be accessible over a network manually by user clients 102 and/or automatically by machine clients 104.

A user client 102 can be a computing device, such as computer or server, whose operations are at least partially being directed by a human user. By way of a non-limiting example, a user client 102 can be a computer operated by a software engineer, such that the software engineer can use the user client 102 to manually submit a code image to the code signing system 100 as will be discussed below. A user client 102 can comprise processors, memory, circuits, and/or other hardware and software elements.

A machine client 104 can be a computing device, such as a computer, server, mobile device, tablet computer, or a consumer electronic device such as a set-top box, that has been configured to automatically communicate with the code signing system 100 without human interaction. By way of a non-limiting example, a machine client 104 can be an automated build machine that has been set up to automatically submit newly compiled code images to the code signing system 100 to be signed, as will be discussed below. By way of another non-limiting example, a machine client 104 can receive files from other equipment and submit them to the code signing system 100, as discussed below with respect to FIG. 9. A machine client 104 can comprise processors, memory, circuits, and/or other hardware and software elements.

Figure 2:
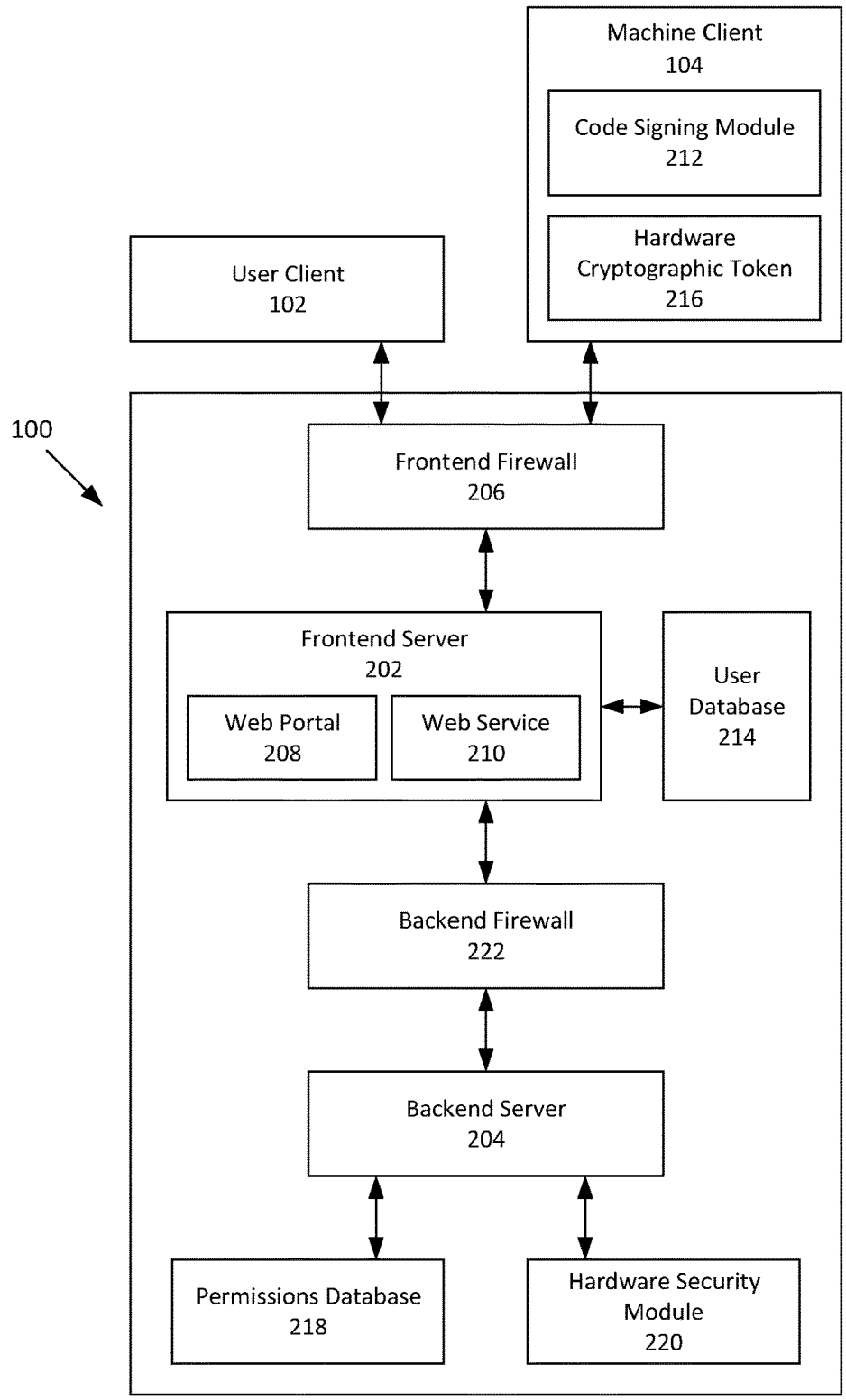
FIG. 2 depicts an exemplary embodiment of a code signing system in communication with a user client and a machine client.

FIG. 2 depicts an exemplary embodiment of a code signing system 100 in communication with a user client 102 and a machine client 104. In this embodiment, the code signing system 100 can comprise a frontend server 202 and a backend server 204. The frontend server 202 can provide an outward-facing presentation layers for interacting with outside components such as user clients 102 and machine clients 104, while the backend server 204 can perform requested cryptographic and/or digital security operations. In some embodiments, the frontend server 202 and backend server 204 can be run on different machines, while in other embodiments the frontend server 202 and backend server 204 can be run on the same machine. Computing machines running the frontend server 202 and/or backend server 204 can comprise processors, memory, circuits, and/or other hardware and software elements.

The frontend server 202 can be a server, such as a web server, that is configured to exchange data over a network with other components outside the code signing system 100, such as user clients 102 and machine clients 104. In some embodiments, the frontend server 202 can be behind a frontend firewall 206 that can be configured to prevent unauthorized access to the frontend server 202. By way of a non-limiting example, the frontend firewall 206 can be configured to limit incoming connections to the frontend server 202 to connections coming from specific domains or Internet Protocol (IP) addresses.

The frontend server 202 can host a web portal 208, such as a website, that can be presented to user clients 102. Authorized human users of user clients 102 can access the web portal 208 to submit files and/or request desired cryptographic and/or digital security operations. By way of a non-limiting example, the web portal 208 be a website with a graphical user interface (GUI) that user clients 102 can reach using a web browser over an HTTPS connection.

The frontend server 202 can also have a web service 210 through which it can interact automatically with machine clients 104. The web service 210 can be configured to authorize and/or authenticate machine clients 104, receive requests for cryptographic and/or digital security operations from machine clients 104, and/or exchange files between the frontend server 202 and machine clients 104.

In some embodiments, the web service 210 can be configured to interact only with a code signing module 212 that is running on the machine client 104. The code signing module 212 can be a software application or other code that is configured to let the machine client 104 interact automatically with the code signing system 100 through the web service 210. By way of a non-limiting example, an operator of the code signing system 100 can provide owners or operators of a machine client 104 with a code signing module 212, such as an executable program or script that can be run on the machine client 104.

In some embodiments, the code signing module 212 can be configured to perform one or more operations on files passed to the web service 210 or received from the web service 210, such as pre-processing an input file prior to code signing or post-processing a received file after code signing. By way of non-limiting examples, the code signing module 212 can be configured to add headers and/or footers to code images before they are transmitted to the web service 210, or to combine a code image with a digital signature received from the web service 210.

The frontend server 202 can have, or be in data communication with, a user database 214. A user database 214 can be configured to hold user credentials for users who have been authorized to access the code signing system 100, such as credentials for human users of user clients 102 and credentials linked to particular machine clients 104. User credentials for a user can include a user identifier and an associated password.

In some embodiments, the user database 214 can be a local database or server run on the same machine as the frontend server 202. In other embodiments the user database 214 can be stored or run on another machine accessible by the frontend server 202 over a network or other data connection. By way of a non-limiting example, in some embodiments the user database 214 can be on a Lightweight Directory Access Protocol (LDAP) or RSA server that stores user identifiers and associated passwords.

For user clients 102, user credentials in the user database 214 can be tied to particular human users. By way of non-limiting examples, the user identifier for a human user can be a username or email address, and the password can be an alphanumeric password assigned to or selected by the human user. In some embodiments, at least part of a user's password can be a frequently changing code that can be read off by the user from a display on a hardware token, such as an RSA Secure ID token. In these embodiments, the frontend server 202 can retrieve the same code displayed by the hardware token from a backend RSA Secure ID server. In other embodiments, at least part of a user's password can be an OTP (One Time Password) that can be retrieved by the user from an OTP application, such as Google Authenticator, which can be run on a device such as a mobile device or a laptop. In these embodiments, the frontend server 202 can retrieve the same OTP from a backend OTP server.

For machine clients 104, user credentials in the user database 214 can be tied to particular machines. By way of a non-limiting example, the user identifier for a particular machine client 104 can be the machine's static IP address, such as an IPv4 or IPv6 address. A password associated with a machine client's user identifier can be provided to the machine client 104. In some embodiments, a machine client's password can be a clear, unencrypted alphanumeric password. In other embodiments, a machine client 104 can be provided with an encrypted password, such that it does not directly have a copy of the clear decrypted password.

In some embodiments in which the machine client 104 is provided with an encrypted password, the machine client 104 can also be provided with a hardware cryptographic token 216. A hardware cryptographic token 216 can be a component such as a smartcard that can be connected to the machine client 104 with a USB connection or other direct data connection. The hardware cryptographic token 216 can store information, such as a digital key, that can be used by the code signing module 212 to decrypt the encrypted password. In these embodiments the code signing module 212 can decrypt and use the clear password during secure communications with the code signing system 100, without storing the clear password in a memory location that is accessible by other programs or users of the machine client 104.

Figure 3:
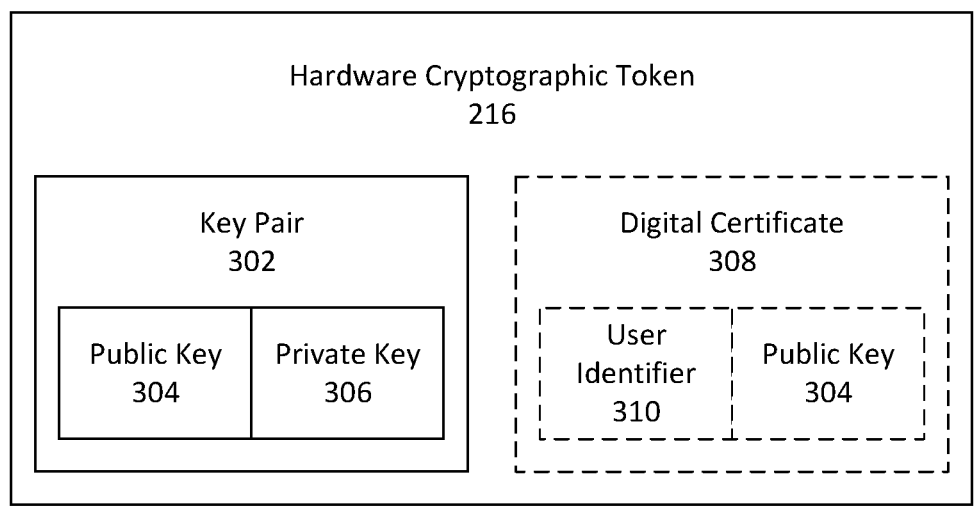
FIG. 3 depicts an exemplary embodiment of a hardware cryptographic token.

As shown in FIG. 3, in some embodiments a hardware cryptographic token 216 can store a key pair 302 comprising a public key 304 and a private key 306. The key pair 302 can be securely stored on the hardware cryptographic token 216 such that it is difficult or impossible to extract or copy the key pair 302 out of the physical hardware cryptographic token 216 without authorization.

In some embodiments the key pair 302 can be generated within the hardware cryptographic token 216 itself. In other embodiments the key pair 302 can be generated outside the hardware cryptographic token 216 and then be loaded onto the hardware cryptographic token 216. In some embodiments a copy of the public key 304 can be stored at the backend server 204 for later verification. In some embodiments, the hardware cryptographic token 216 can also store a digital certificate 308 that links the machine client's public key 304 with its user identifier 310, such as its static IP address.

In some embodiments if the hardware cryptographic token 216 is lost, damaged, or compromised, the credentials associated with the hardware cryptographic token 216 can be revoked at the code signing system 100 and/or user database 214, and a new hardware cryptographic token 216 with a new key pair 302 and a new corresponding encrypted password can be provided to the owner or operator of the machine client 104. In other embodiments, the digital certificate 308 on the hardware cryptographic token 216 can be revoked, and its identity added to a Certificate Revocation List (CRL) at the code signing system 100. A new hardware cryptographic token 216 with a new key pair 302 and/or digital certificate 308 can then be issued. As will be explained below with respect to FIGS. 7 and 8, in some embodiments if a machine client 104 attempts to connect to the code signing system 100 using a digital certificate 308 that appears on a CRL, the attempted connection can be denied.

Returning to FIG. 2, the backend server 204 can be a server in communication with the frontend server 202, and can also have or be in communication with a permissions database 218 and a hardware security module 220. In some embodiments, a backend firewall 222 can be positioned between the frontend server 202 and the backend server 204 to protect access to the permissions database 218 and the hardware security module 220.

The permissions database 218 can store a permissions set for each authorized user, including human users of user clients 102 and individual machine clients 104. A permissions set can comprise one or more permission settings indicating whether or not a user has been authorized to request particular cryptographic and/or digital security operations at the code signing system 100.

The hardware security module 220 can be a hardware component coupled with the backend server 204 that is configured to generate, manage, and/or store digital code signing keys. In alternate embodiments, in place of or in addition to the hardware security module 220, the backend server 204 can have or be connected to one or more software components that can generate, manage, and/or store digital code signing keys, such as a key repository or database.

As described above, the backend server 204 can be configured to perform one or more cryptographic and/or digital security operations, such as digitally signing code images or other types of digital objects, generating digital signatures, encrypting code, and/or decrypting code. By way of a first non-limiting example, the backend server 204 can receive an unsigned code image from a user client 102 or machine client 104 via the frontend server 202, retrieve a digital key from the hardware security module 220, and can use that digital key to sign the received code image using PKCS#1, PKCS#7, or any other standard or proprietary code signing mechanism. By way of a second non-limiting example, the backend server 204 can receive a hash of a code image generated by a machine client 104 or from a user client 102, retrieve a digital key from the hardware security module 220, generate a digital signature for the hash using the digital key, and return the digital signature to the machine client 104 so that the machine client 104 can combine the code image with the digital signature and/or the user client 102. By way of a third non-limiting example, the backend server 204 can generate a signed object for a particular hardware device that includes permission flags to unlock and/or enable diagnostic functions, debugging functions, or other restricted functions on the hardware device, as described in U.S. Pat. No. 8,266,684, herein incorporated by reference.

In some embodiments, the backend server 204 can have dynamically loadable libraries (DLLs) for various cryptographic and/or digital security operations. When a particular operation is requested, corresponding DLLs can be injected such that the backend server 204 can perform the requested operation. After the backend server 204 has completed requested cryptographic and/or digital security operations, it can pass the result back to the frontend server 202, where it can be accessed by the requesting user client 102 or machine client 104. In some situations the result can be a file such as a signed code image, a digital signature, encrypted code, decrypted code, or any other type of signed object. In other situations, if the backend server 204 did not complete the requested operation successfully, the result returned to the frontend server 202 can be an error code.

In some embodiments, the backend server 204 can have a window service layer, business logic layer (BLL), and a data access layer (DAL). The window service layer can perform requested cryptographic and/or digital security operations. The business logic layer can determine whether a user's permissions set allows them to request particular operations, and/or creates and updates audit logs and other reports. The data access layer can provide the backend server 204 with access to the permissions database 218, and/or allow administrators to add, edit, and remove permissions sets in the permissions database 218.

Figure 4:
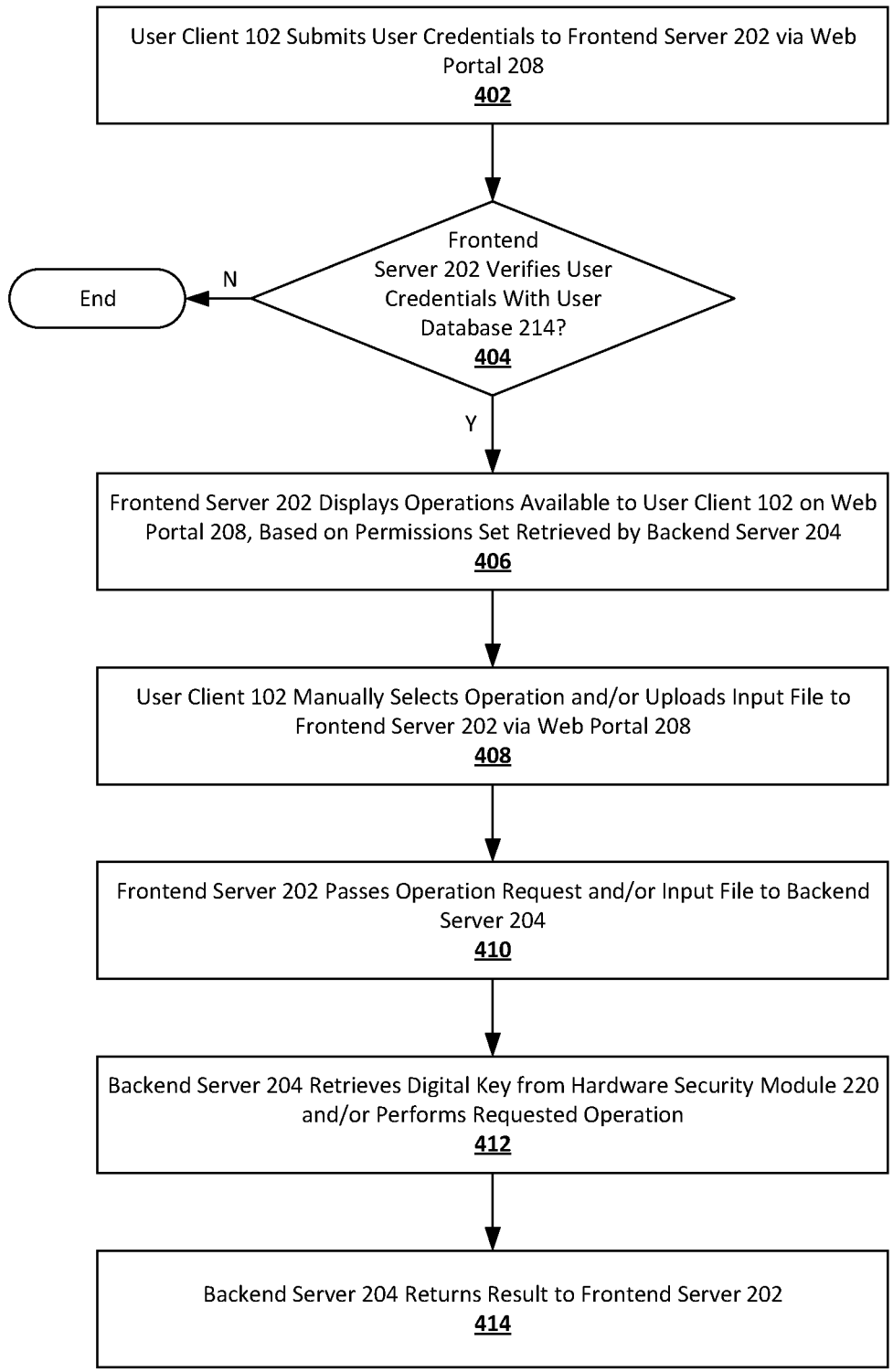
FIG. 4 depicts a flowchart of an exemplary process for a human user to request cryptographic and/or digital security operations at a code signing server using a user client.

FIG. 4 depicts a flowchart of an exemplary process for a human user to request cryptographic and/or digital security operations at a code signing system 100 using a user client 102.

Prior to the steps of FIG. 4, user credentials and permissions sets for the human user can have been added to the code signing system 100. By way of a non-limiting example, an administrator can be informed that a software engineer is working on a software development project that will need its code to be digitally signed. The administrator can accordingly add or update the engineer's user identifier and password to the user database 214, as well as adding or updating a permissions set associated with the engineer in the permissions database 218 to permit the engineer to request code signing via the code signing system 100 manually through a user client 102.

At step 402, the user client 102 can attempt to log in to the web portal 208. The user client 102 can load the web portal 208 with a web browser, after which the human user can input his or her user credentials, such as a username and password. The entered user credentials can be sent from the user client 102 to the frontend server 202.

At step 404, the frontend server 202 can attempt to verify the submitted user credentials as valid. The frontend server 202 can check the user database 214 to determine if the user credentials are valid. If not, the process can end and the user client 102 can be denied access to the web portal 208. However, if the user database 214 verifies the user credentials, the user client 102 can be granted access to the web portal 208.

At step 406, if the user database 214 verified the user credentials submitted via the user client 102, the frontend server 202 can determine which cryptographic and/or digital security operations the user has been authorized to request. The frontend server 202 can send the user identifier from the user credentials to the backend server 204, which can look up a permissions set associated with that user identifier from the permissions database 218. In some embodiments the backend server 204 can return the permissions set to the frontend server 202 for the frontend server 202 to parse. By way of a non-limiting example, the backend server 204 can provide a user's permissions set to the frontend server 202 via a Simple Object Access Protocol (SOAP) interface. In other embodiments, the backend server 204 can parse the retrieved permissions set itself, and can indicate to the frontend server 202 which cryptographic and/or digital security operations the user has been authorized to request.

In some embodiments, the frontend server 202 can limit the available options displayed to the user via the web portal 208 to only those cryptographic and/or digital security operations the user has previously been authorized to request. In other embodiments, unauthorized operations can be grayed out or unselectable on the web portal 208, or an error message can be displayed if the user selects an operation he or she has not been authorized to select.

At step 408, the user can use the web portal 208 to select one of the cryptographic and/or digital security operations he or she has been authorized to request. If the requested cryptographic and/or digital security operation involves processing a code image or other input file, the user client 102 can upload a file to the frontend server via the web portal 208.

At step 410, the frontend server 202 can pass the request for a cryptographic and/or digital security operation to the backend server 204, along with any uploaded input files.

At step 412, the backend server 204 can perform the requested cryptographic and/or digital security operation.

By way of a non-limiting example, if the user client 102 requested that the code signing system 100 sign an uploaded code image, the backend server 204 can retrieve a code signing key from the hardware security module 220 and use it to sign the code image.

At step 414, the backend server 204 can return the result of the requested operation to the frontend server 202. By way of a non-limiting example, when the user client 102 requested that the code signing system 100 sign an uploaded code image, the signed code image generated by the backend server 204 during step 412 can be returned to the frontend server 202 during step 414, such that frontend server 202 can make the signed code image available to download to the user client 102 via the web portal 208. By way of another non-limiting example, when the user client 102 requested generation of a signed digital object that includes permission flags for restricted debugging or diagnostic functions in a particular hardware device, the backend server 204 can return a signed object to the frontend server 202 such that it can be downloaded by the user client 102 via the web portal 208. If the backend server 204 did not successfully complete the requested operation for any reason, the backend server 204 can return an error code to the frontend server 202.

Figure 5:
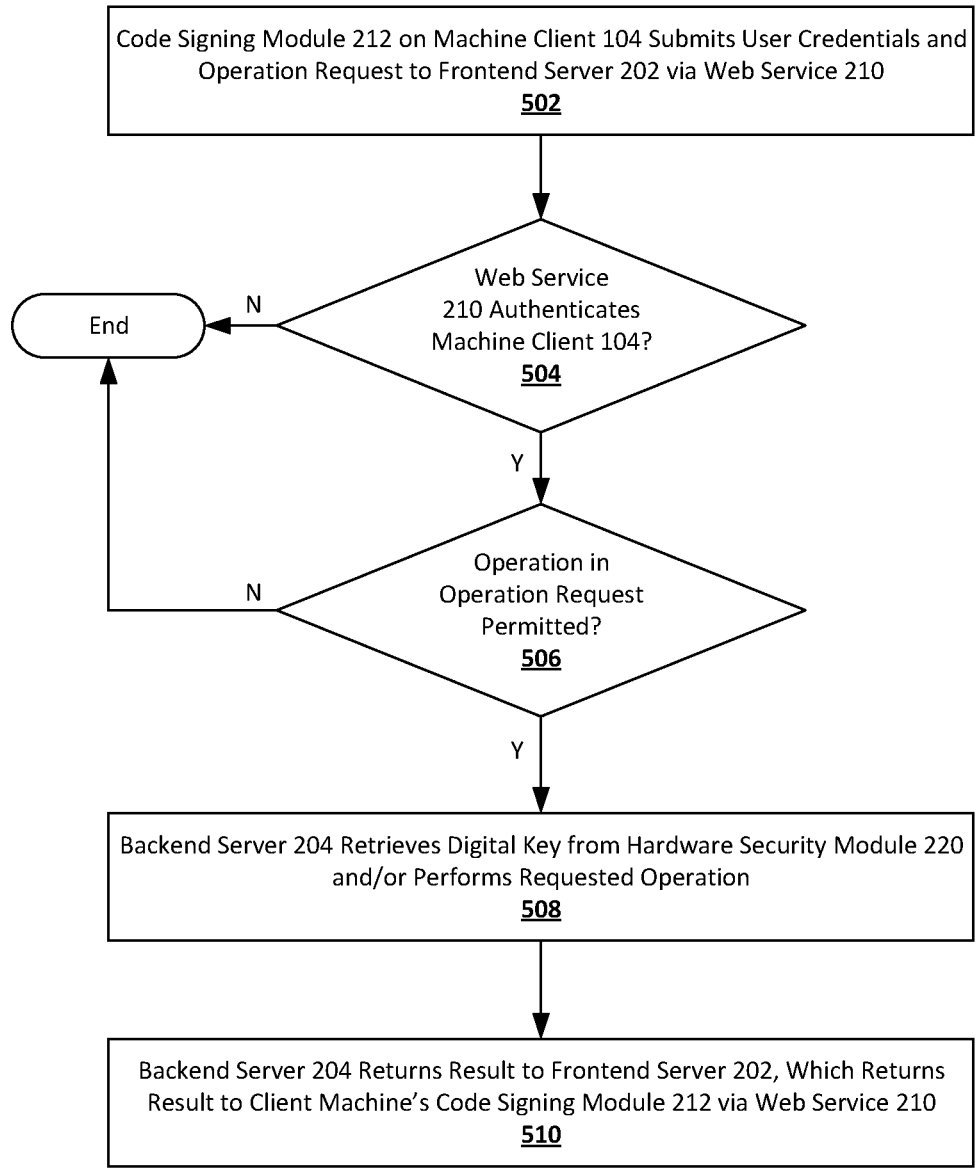
FIG. 5 depicts a flowchart of an exemplary process for a machine client to automatically request cryptographic and/or digital security operations at a code signing server using a code signing module running on the machine client.

FIG. 5 depicts a flowchart of an exemplary process for a machine client 104 to automatically request cryptographic and/or digital security operations at a code signing system 100 using a code signing module 212 running on the machine client 104. The code signing module 212 can be configured to request cryptographic and/or digital security operations automatically without direct human interaction. By way of a non-limiting example, the machine client 104 can be configured to automatically invoke the code signing module 212 to request code signing of a new code image after it compiles and builds the new code image, regardless of whether the software build process for creating that code image was started automatically or through an instruction input by a human user.

Prior to the steps of FIG. 5, user credentials and permissions sets for the machine client 104 can have been added to the code signing system 100. By way of a non-limiting example, the owner or operator of the code signing system 100 can be informed that a company has requested that its automated build machine be allowed to automatically submit code images to the code signing system 100 for signing via the web service 210. The owner or operator of the code signing system 100 can accordingly add or update a user identifier and password associated with the machine client 104 to the user database, as well as adding or updating a permissions set associated with the machine client 104 in the permissions database 218 to permit the machine client 104 to request code signing via the code signing system 100 automatically. As discussed above, in some embodiments the owner or operator of the code signing system 100 can also issue a hardware cryptographic token 216 for the machine client 104, and provide a code signing module 212 that can be run on the machine client 104.

At step 502, the machine client's code signing module 212 can connect to the frontend server's web service 210. The operation code signing module 212 can submit the machine client's user credentials to the web service 210, as well an operation request. In some embodiments the code signing module 212 can retrieve some or all of the machine client's user credentials from the hardware cryptographic token 216 connected to the machine client 104, as will be discussed further below. The operation request can indicate which cryptographic and/or digital security operations are being requested by the machine client, as well as a code image or other input file if the machine image is requesting a cryptographic and/or digital security operation that involves processes an input file.

At step 504, the web service 210 can attempt to authenticate the machine client 104. The web service 210 can attempt to authenticate the machine client 104 using one of the authentication methods described below with respect to FIGS. 6-8, or any other authentication method. If the web service 210 does not authenticate the machine client 104, the process can end and the machine client 104 can be denied access to the web service 210. However, if the web service 210 authenticates the machine client 104, the machine client 104 can be granted access to other aspects of the web service 210.

At step 506, if the web service 210 authenticated the machine client 104, the web service 210 can determine which cryptographic and/or digital security operations the machine client 104 has been authorized to request. The frontend server 202 can send the machine client's user identifier to the backend server 204, which can look up a permissions set associated with that user identifier from the permissions database 218. In some embodiments the backend server 204 can return the permissions set to the frontend server 202 for the web service 210 to parse. By way of a non-limiting example, the backend server 204 can provide a user's permissions set to the frontend server 202 via a Simple Object Access Protocol (SOAP) interface. In other embodiments, the backend server 204 can parse the retrieved permissions set itself, and can indicate to the frontend server 202 which cryptographic and/or digital security operations the user has been authorized to request.

If the operation request received from the code signing module 212 requested a cryptographic and/or digital security operation that the machine client 104 has not previously been permitted to request, the process can end and/or an error message can be sent from the web service 210 to the code signing module 212. However, if the operation request requested a cryptographic and/or digital security operation that the machine client 104 has previously been permitted to request, the web service 210 can pass the request to the backend server 204 along with any uploaded input files.

At step 508, the backend server 204 can perform the requested operation. By way of a non-limiting example, if operation request included a request that the code signing system 100 sign an uploaded code image, the backend server 204 invoke the hardware security module 220 to sign the code image using an appropriate hardware-protected code signing key.

At step 510, the backend server 204 can return the result of the requested operation to the frontend server 202, which can pass the result back to the client machine's code signing module 212 via the web service 210. By way of a non-limiting example, when the operation request requested that the code signing system 100 sign an uploaded code image, the signed code image generated by the backend server 204 during step 508 can be returned to the frontend server 202 during step 510, such that frontend server 202 can send it to the machine client 104 via the web service 210. By way of another non-limiting example, when the operation request requested a digital signature for a hash of a code image provided by the machine client 104 to the code signing system 100, the backend server 204 can generate a digital signature and return it to the frontend server 202, such that the web service 210 can return it to the machine client 104 and the machine client 104 can combine the code image with the generated digital signature. If the backend server 204 did not successfully complete the requested operation for any reason, the backend server 204 can return an error code to the frontend server 202, which can pass the error code to the machine client 104.

Figure 6:
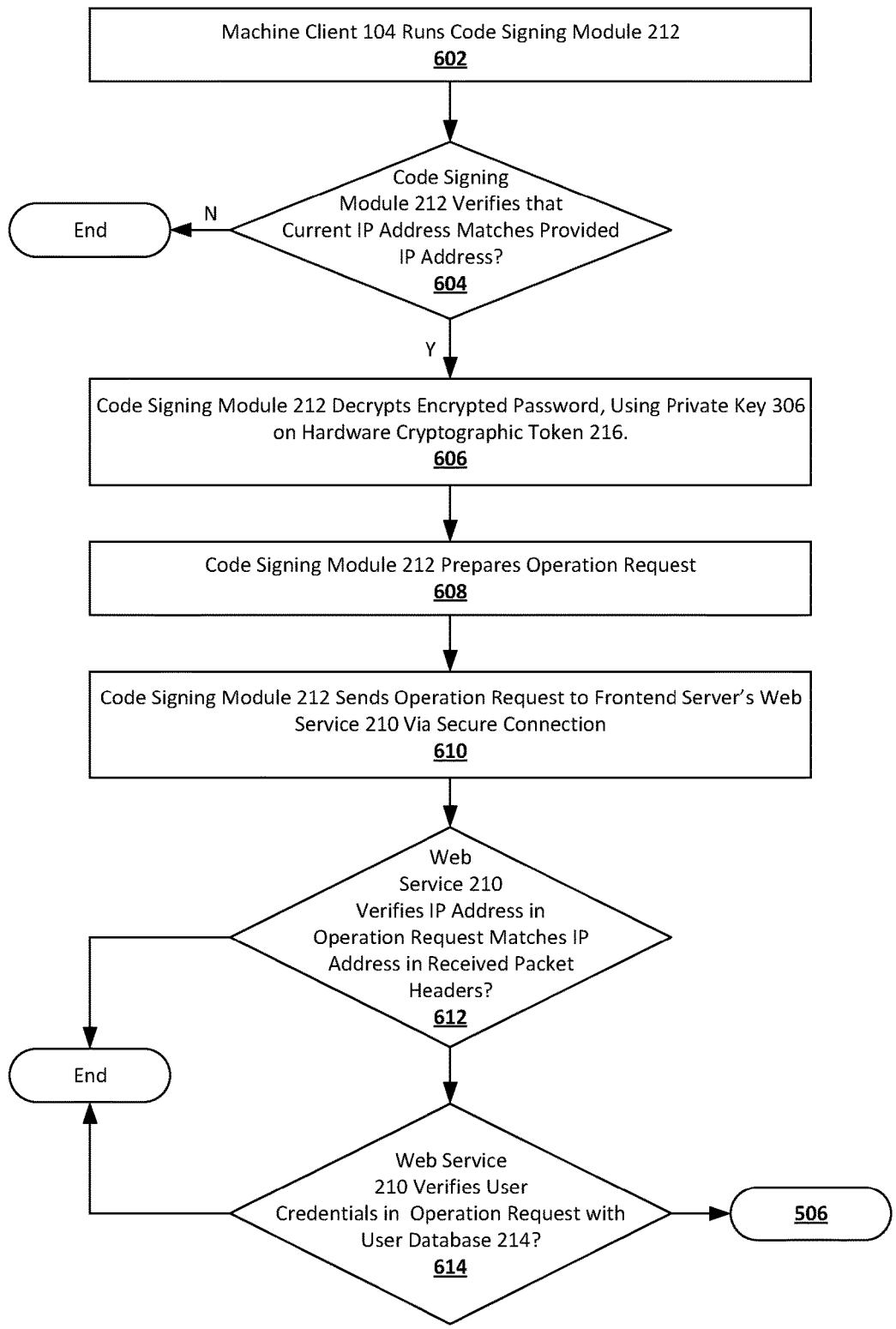
FIG. 6 depicts an embodiment of a first exemplary authentication method for authenticating a machine client at a code signing system.
Figure 7:
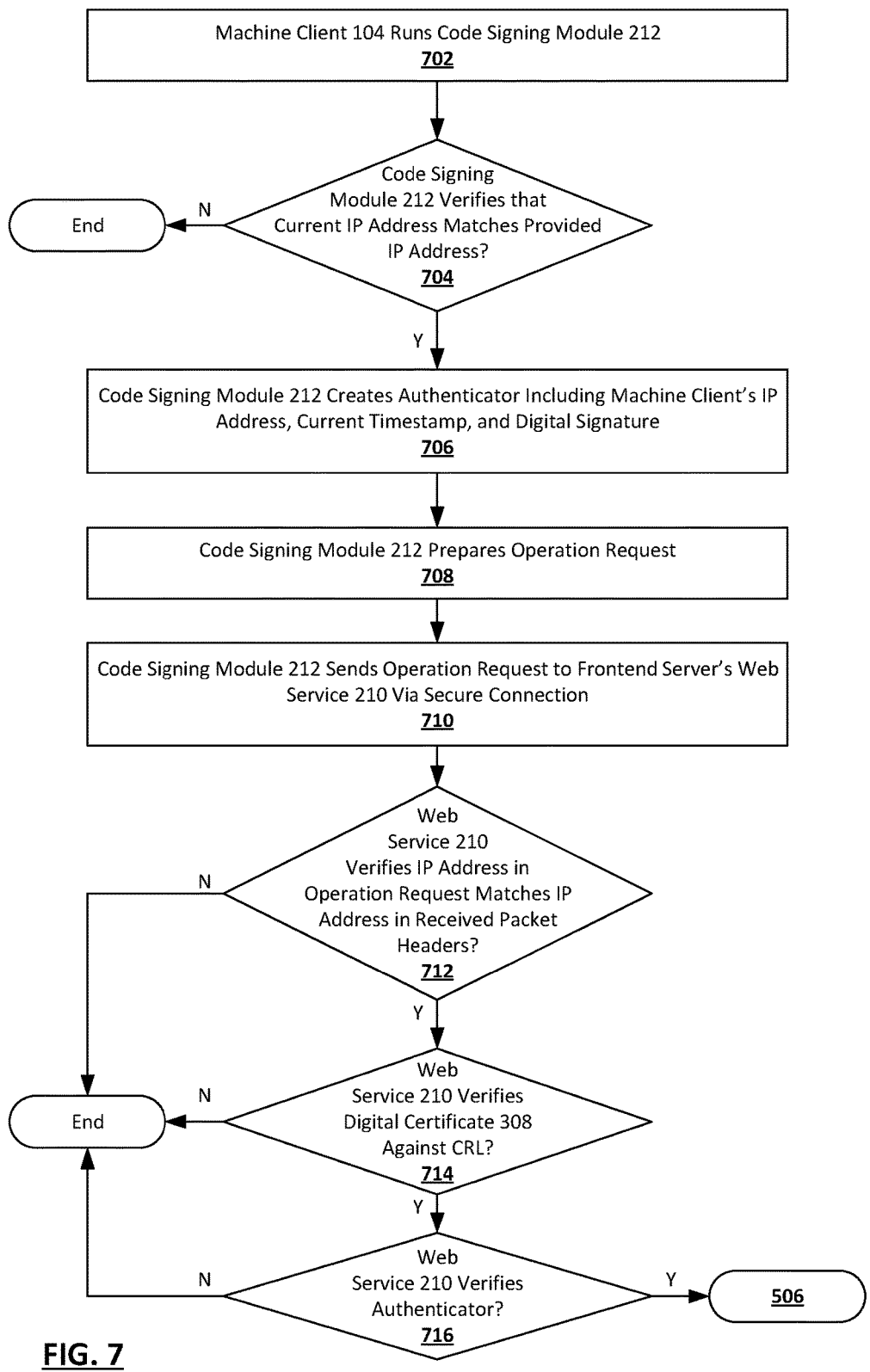
FIG. 7 depicts an embodiment of a second exemplary authentication method for authenticating a machine client at a code signing system.
Figure 8:
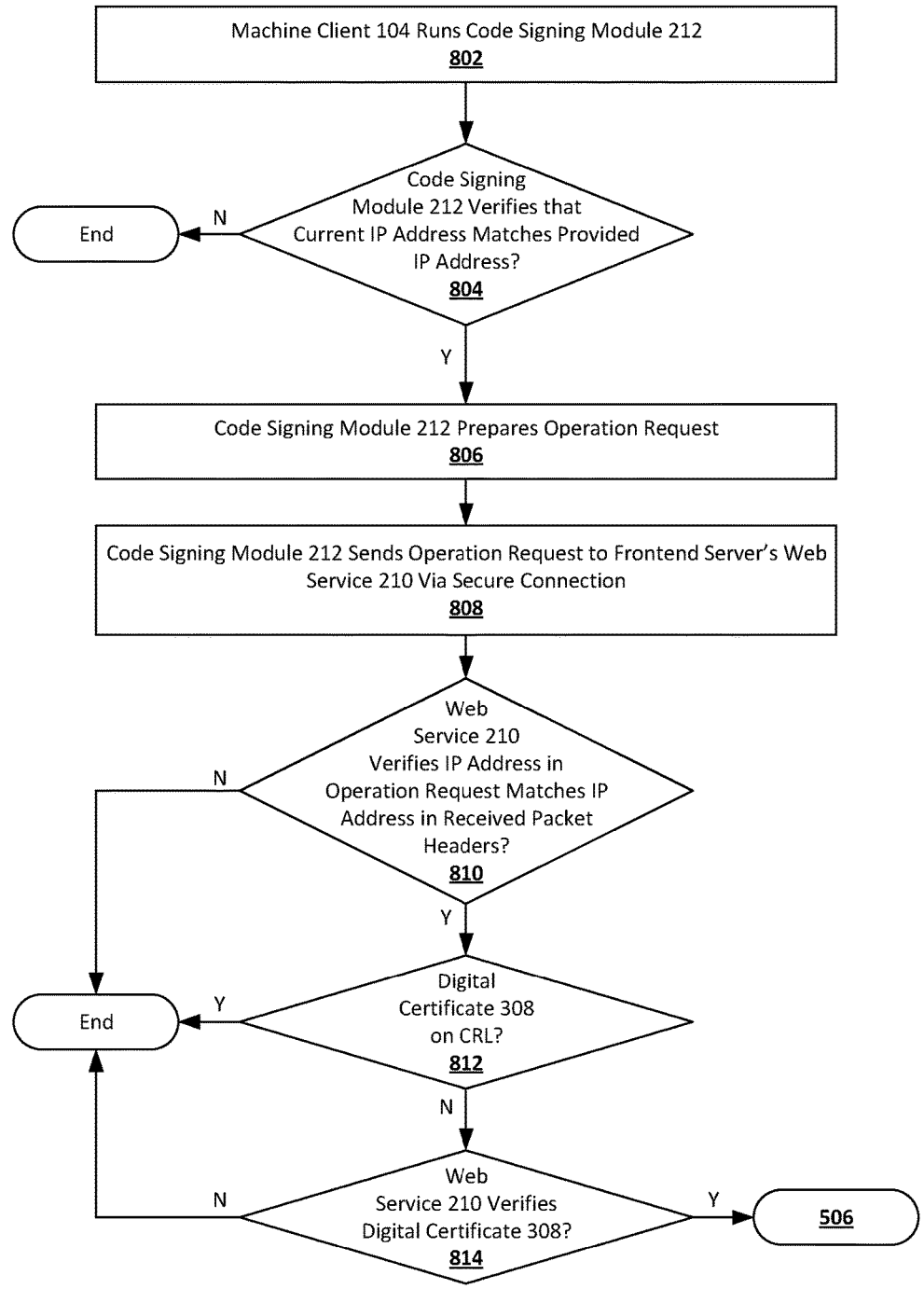
FIG. 8 depicts an embodiment of a third exemplary authentication method for authenticating a machine client at a code signing system.

As described above with respect to step 504, the web service 210 can attempt to authenticate the machine client 104 through different authentication methods. FIGS. 6-8 depicts non-limiting examples of authentication methods through which the web service 210 can authenticate a machine client 104.

FIG. 6 depicts an embodiment of a first exemplary authentication method that can be used during steps 502 and 504. In this embodiment the code signing system 100, or the owner or operator of the code signing system 100, can have originally generated the machine client's password and encrypted it with the machine client's private key 306. The encrypted password can be provided to the owner or operator of the machine client 104, thus keeping the clear unencrypted password secret. The corresponding private key 306 can be stored and protected on a hardware cryptographic token 216 provided to the owner or operator of the machine client 104. The encrypted password can be entered into the code signing module 212 for later use. In some embodiments or situations, the password can be periodically changed by the owner or operator of the code signing system 100, and new encrypted passwords encrypted with the same public key 304 can accordingly be provided to the machine client 104.

In some embodiments or situations, the machine client's code signing module 212 can be pre-loaded or pre-configured with the machine client's IP address as its user identifier, and the encrypted password. In alternate embodiments, the code signing module 212 can load the machine client's user credentials from a file or database on the machine client 104 when the code signing module 212 is invoked.

At step 602, the machine client 104 can run the code signing module 212. The machine client 104 can have been configured to run the code signing module 212 automatically at a scheduled time, or upon the occurrence of a specified event. By way of a non-limiting example, the machine client 104 can be configured to run the code signing module 212 after a new software image is compiled and built at the machine client 104.

In some embodiments, at step 604 the code signing module 212 can verify that the machine client's current IP address matches the IP address provided to it as the machine client's user identifier. If the machine client's current IP address does not match the user identifier, the process can end and the code signing module 212 can refuse to request any operations from the code signing system 100. If the machine client's current IP address does match the user identifier, the code signing module 212 can move to step 606. In other embodiments, step 604 can be skipped, and the code signing module 212 can move from step 602 directly to step 606 without performing IP address verification.

At step 606, the code signing module 212 can decrypt the encrypted version of the password. The code signing module 212 can securely access the private key 306 on the hardware cryptographic token 216. It can then use the private key 306 to decrypt the encrypted password provided to the code signing module 212. The clear decrypted password can be stored in a secure memory location not accessible to other users or programs at the machine client 104.

At step 608, the code signing module 212 can prepare an operation request. The operation request can comprise the machine client's user identifier, such as its IP address, the decrypted password generated during step 606, and a request for a particular cryptographic and/or digital security operation. If the requested cryptographic and/or digital security operation involves processing an input file at the code signing system 100, the operation request can also include a copy of the input file, such as code image or hash.

At step 610, the code signing module 212 can send the operation request to the frontend server's web service 210 via a secure connection where server authentication is based on a server certificate that chains to a trusted root certificate authority (CA) that has been pre-configured in the client, such that the clear decrypted password can be protected from eavesdroppers during transmission. In some embodiments, the code signing module 212 can send the operation request to the frontend server's web service 210 over a one-way SSL (Secure Sockets Layer) connection, or another secure connection such as a TLS (Transport Layer Security) connection.

In some embodiments, the web service 210 can review incoming packets from the code signing module 212 at step 612 to verify that the IP address in the packets' headers match the IP address sent as the user identifier in the operation request. If the IP address in the packet headers does not match the IP address in the operation request, the web service 210 can refuse the operation request, and the process can end. However, if the IP address in the packet headers does match the IP address in the operation request, the web service 210 can move to step 614. In other embodiments, step 612 can be skipped, and the web service 210 can proceed with step 614 without first performing IP address verification.

At step 614, the web service 210 can verify the user credentials in the operation request against the user database 214. By way of a non-limiting example, the web service 210 can verify the IP address sent as the user identifier and the clear decrypted password with an LDAP server or other user database 214. If the user credentials in the operation request are not verified with the user database 214, the process can end. However, if the user credentials in the operation request are verified with the user database 214, the web service 210 can confirm that the machine client 104 is authorized, and move to step 506 of FIG. 5 to attempt to perform the requested cryptographic and/or digital security operation.

FIG. 7 depicts an embodiment of a second exemplary authentication method that can be used during steps 502 and 504. In this embodiment the code signing system 100, a private key 306 and a corresponding digital certificate 308 can be stored on a hardware cryptographic token 216 provided to the owner or operator of the machine client 104. As described above, the digital certificate 308 can comprise a user identifier 310 tied to the machine client 104, such as its static IP address.

At step 702, the machine client 104 can run the code signing module 212. The machine client 104 can have been configured to run the code signing module 212 automatically at a scheduled time, or upon the occurrence of a specified event. By way of a non-limiting example, the machine client 104 can be configured to run the code signing module 212 after a new software image is compiled and built at the machine client 104.

In some embodiments, at step 704 the code signing module 212 can securely access the private key 306 and the corresponding digital certificate 308 on the hardware cryptographic token 216, and can verify that the machine client's current IP address matches the IP address stored as the user identifier 310 in the digital certificate 308. If the machine client's current IP address does not match the user identifier 310, the process can end and the code signing module 212 can refuse to request any operations from the code signing system 100. If the machine client's current IP address does match the user identifier 310, the code signing module 212 can move to step 706. In other embodiments, step 704 can be skipped, and the code signing module 212 can move from step 702 directly to step 706 without performing IP address verification.

At step 706, the code signing module 212 can generate an authenticator. An authenticator can be data blob comprising the machine client's IP address, a current timestamp, and other information such that the type of cryptographic operation being requested. The code signing module 212 can digitally sign the authenticator using the private key 306 located on the hardware cryptographic token 216.

At step 708, the code signing module 212 can prepare an operation request. The operation request can comprise the authenticator generated during step 706, a copy of the digital certificate 308 from the hardware cryptographic token 216, and a request for a particular cryptographic and/or digital security operation. If the requested cryptographic and/or digital security operation involves processing an input file at the code signing system 100, the operation request can also include a copy of the input file, such as code image or hash.

At step 710, the code signing module 212 can send the operation request to the frontend server's web service 210 via a secure connection where server authentication is based on a server certificate that chains to a trusted root CA that has been pre-configured in the client. In some embodiments, the code signing module 212 can send the operation request to the frontend server's web service 210 over a one-way SSL connection, or another secure connection such as a TLS connection.

In some embodiments, the web service 210 can review incoming packets from the code signing module 212 at step 712 to verify that the IP address in the packets' headers match the IP address in the digital certificate 308 sent as part of the operation request. If the IP address in the packet headers does not match the IP address in the digital certificate 308, the web service 210 can refuse the operation request, and the process can end. However, if the IP address in the packet headers does match the IP address in the digital certificate 308, the web service 210 can move to step 714. In other embodiments, step 712 can be skipped, and the web service 210 can proceed with step 714 without first performing IP address verification.

At step 714, the web service 210 can verify that the digital certificate 308 has not been revoked, by checking it against a Certificate Revocation List (CRL) maintained at, or accessible by, the code signing system 100. The web service 210 can also verify the digital certificate 308 to ensure it is chained to a trusted CA that has been pre-configured on the frontend server 202 to issue machine account certificates. If the digital certificate 308 appears on a CRL, thereby indicating that it has been revoked automatically or by an administrator, and/or if the web service 201 does not verify the digital certificate 308, the process can end. However, if the digital certificate 308 does not appear on a CRL and is verified, the web service 210 can move to step 716.

At step 716, the web service 210 can verify the authenticator included in the operation request. The web service 210 can verify the authenticator's digital signature with the public key 304 extracted from the digital certificate 308. The web service 210 can also verify that the authenticator's timestamp is within a predefined time window. By way of a non-limiting example, the web service 210 can verify that the authenticator's timestamp is within the last five minutes. If the web service 210 does not verify the authenticator, the process can end. However, if the web service 210 does verify the authenticator, the web service 210 can confirm that the machine client 104 is authorized to request the requested operation, and move to step 506 of FIG. 5 to attempt to perform the requested cryptographic and/or digital security operation.

In some embodiments, the web service 210 can additionally verify the IP address received in the data blob and/or digital certificate 308 against a user database 214, such as an LDAP server, although in other embodiments this step can be skipped in this embodiment.

FIG. 8 depicts an embodiment of a third exemplary authentication method that can be used during steps 502 and 504. In this embodiment the code signing system 100, a private key 306 and a corresponding digital certificate 308 can be stored on a hardware cryptographic token 216 provided to the owner or operator of the machine client 104. As described above, the digital certificate 308 can comprise a user identifier 310 tied to the machine client 104, such as its static IP address.

At step 802, the machine client 104 can run the code signing module 212. The machine client 104 can have been configured to run the code signing module 212 automatically at a scheduled time, or upon the occurrence of a specified event. By way of a non-limiting example, the machine client 104 can be configured to run the code signing module 212 after a new software image is compiled and built at the machine client 104.

In some embodiments, at step 804 the code signing module 212 can securely access the digital certificate 308 on the hardware cryptographic token 216, and can verify that the machine client's current IP address matches the IP address stored as the user identifier 310 in the digital certificate 308. If the machine client's current IP address does not match the user identifier 310, the process can end and the code signing module 212 can refuse to request any operations from the code signing system 100. If the machine client's current IP address does match the user identifier 310, the code signing module 212 can move to step 806. In other embodiments, step 804 can be skipped, and the code signing module 212 can move from step 802 directly to step 806 without performing IP address verification.

At step 806, the code signing module 212 can prepare an operation request. The operation request can comprise a request for a particular cryptographic and/or digital security operation. If the requested cryptographic and/or digital security operation involves processing an input file at the code signing system 100, the operation request can also include a copy of the input file, such as code image or hash.

At step 808, the code signing module 212 can send the operation request to the frontend server's web service 210 via a secure two-way connection. In some embodiments, the code signing module 212 can send the operation request to the frontend server's web service 210 over a two-way SSL (Secure Sockets Layer) connection or other secure connection, such that the communication is mutually authenticated based on digital certificates from both ends of the connection. In this embodiment, the digital certificate 308 from the hardware cryptographic token 216 can be provided by the code signing module 12 as part of the SSL handshake.

In some embodiments, the web service 210 can review incoming packets from the code signing module 212 at step 810 to verify that the IP address in the packets' headers match the IP address in the digital certificate 308 sent as part of the operation request. If the IP address in the packet headers does not match the IP address in the digital certificate 308, the web service 210 can refuse the operation request, and the process can end. However, if the IP address in the packet headers does match the IP address in the digital certificate 308, the web service 210 can move to step 812. In other embodiments, step 810 can be skipped, and the web service 210 can proceed with step 812 without first performing IP address verification.

At step 812, the web service 210 can verify that the digital certificate 308 has not been revoked, by checking it against a Certificate Revocation List (CRL) maintained at, or accessible by, the code signing system 100. If the digital certificate 308 appears on a CRL, indicating that it has been revoked automatically or by an administrator, the process can end. However, if the digital certificate 308 does not appear on a CRL, the web service 210 can move to step 814.

At step 814, the web service 210 can verify the digital signature on the digital certificate 308. If the web service 210 does not verify the digital signature, the process can end. However, if the web service 210 does verify the digital signature, the web service 210 can confirm that the machine client 104 is authorized, and move to step 506 of FIG. 5 to attempt to perform the requested cryptographic and/or digital security operation.

In some embodiments, the web service 210 can additionally verify the IP address received in the digital certificate 308 against a user database 214, such as an LDAP Server, although in other embodiments this step can be skipped in this embodiment.

Figure 9:
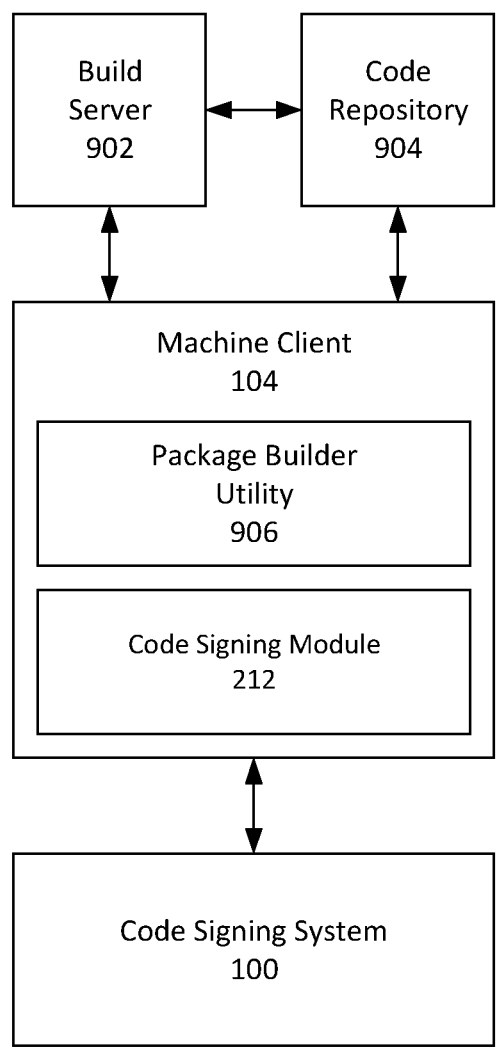
FIG. 9 depicts an alternate operating environment in which a machine client 104 can receive files from other equipment and request code signing on an automated basis with a code signing system.

FIG. 9 depicts an alternate operating environment in which a machine client 104 can receive one or more unsigned code images from other equipment and request digital signatures for those code images from a code signing system configured to communicate on an automated basis with client machines 104, such as the code signing system 100 described above or any other code signing system configured to communicate automatically with a code signing module 212 running on the machine client 104. In the operating environment of FIG. 9, the client machine 104 can be in at least temporary data communication with a build server 902 and a code repository 904.

The client machine 104 can also run a package builder utility 906 and a code signing module 212. While FIG. 9 depicts the client machine 104 running both the package builder utility 906 and the code signing module 212, in alternate embodiments the package builder utility 906 and the code signing module 212 can be run on separate machines, with either or both considered to be the machine client 104.

The build server 902 can be a computer, server, or build machine that builds and/or compiles unsigned code images. The build server 902 can comprise processors, memory, circuits, and/or other hardware and software elements. In some embodiments, the build server 902 can be scheduled to perform new software builds automatically at predefined times, such as a nightly build that incorporates some or all source code modules, including those updated within the previous day. The build server 902 can maintain a build log for each code image it generates. A build log can include a list of source code modules that were compiled to generate the code image.

The code repository 904 can be a database or other data storage location that digitally stores code images. Unsigned code images produced by the build server 902 can be uploaded or otherwise transferred to the code repository 904 for storage. In some embodiments, each code image stored at the code repository 904 can be associated with a URL (Uniform Resource Locator) or other identifier.

The package builder utility 906 can be a program or script that can run on the machine client 104. In some embodiments, the package builder utility 906 and code signing module 212 can be separate programs or scripts that can be run separately on the machine client 104. In other embodiments, the package builder utility 906 and code signing module 212 can be combined into a single program or script.

The package builder utility 906 can be configured to receive a build notification from the build server 902 that indicates that one or more new code images have been produced and stored at the code repository. In some embodiments a build notification can be an email, while in other embodiments a build notification can be any other type of digitally transferred data. The build notification can indicate URLs or other file identifiers through which the package builder utility 906 can access the code images at the code repository 904. In some embodiments, the build notification can also indicate URLs or other file identifiers for build logs stored at the build server 902 that are associated with the code images.

The package builder utility 906 can be configured to respond to a received build notification by retrieving the unsigned code images from the code repository 904 and the associated build log from the build server 902, using URLs or file identifiers provided in the build notification. In some embodiments or situations, the build notification can list a single unsigned code image, and the package builder utility 906 can retrieve that code image and its associated build log. In other embodiments or situations, the build notification can list multiple unsigned code images, and the package builder utility 906 can retrieve all of the listed code images and their associated build logs.

Figure 10:
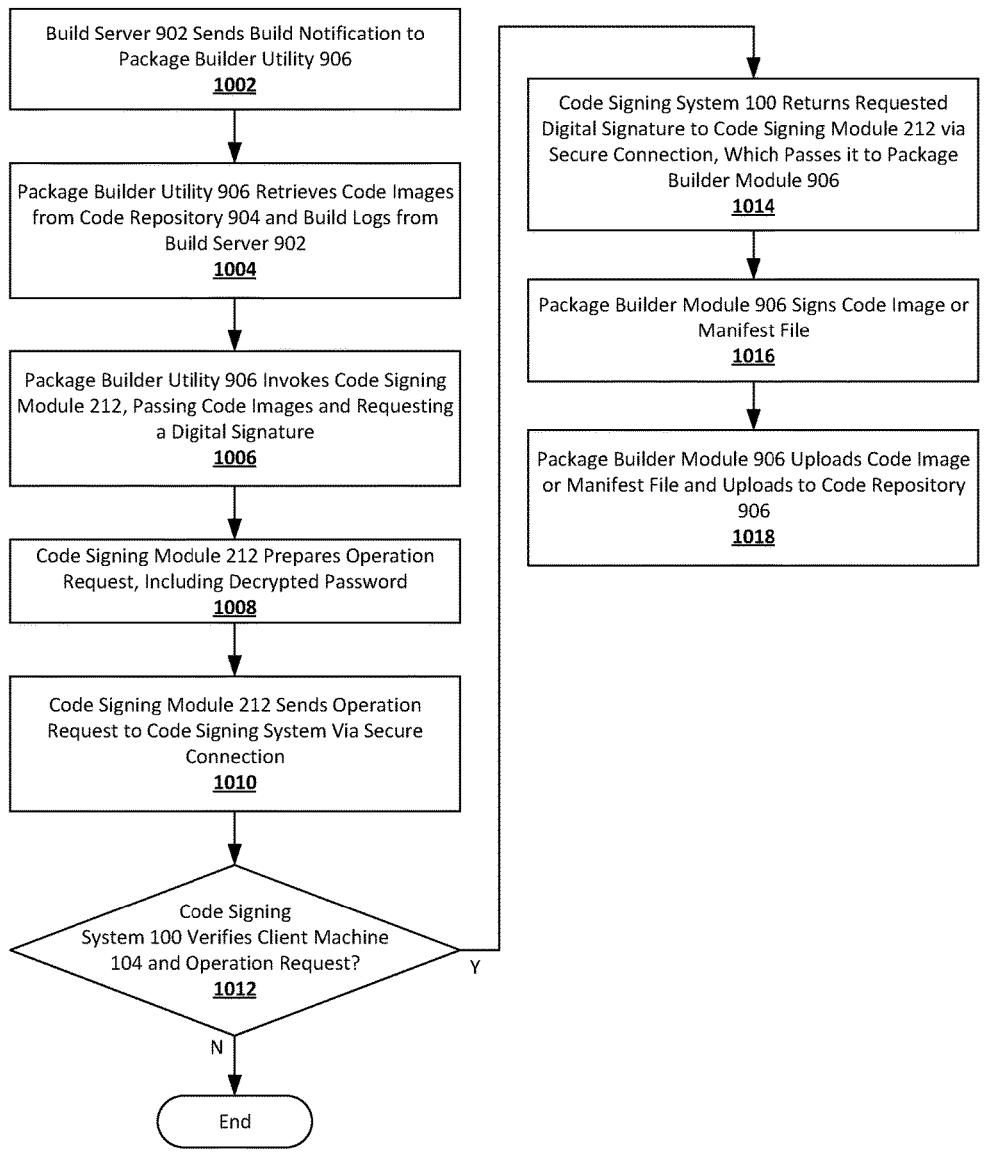
FIG. 10 depicts a first exemplary process for signing a code image or manifest file with a package builder utility, within the operating environment shown in FIG. 9.
Figure 11:
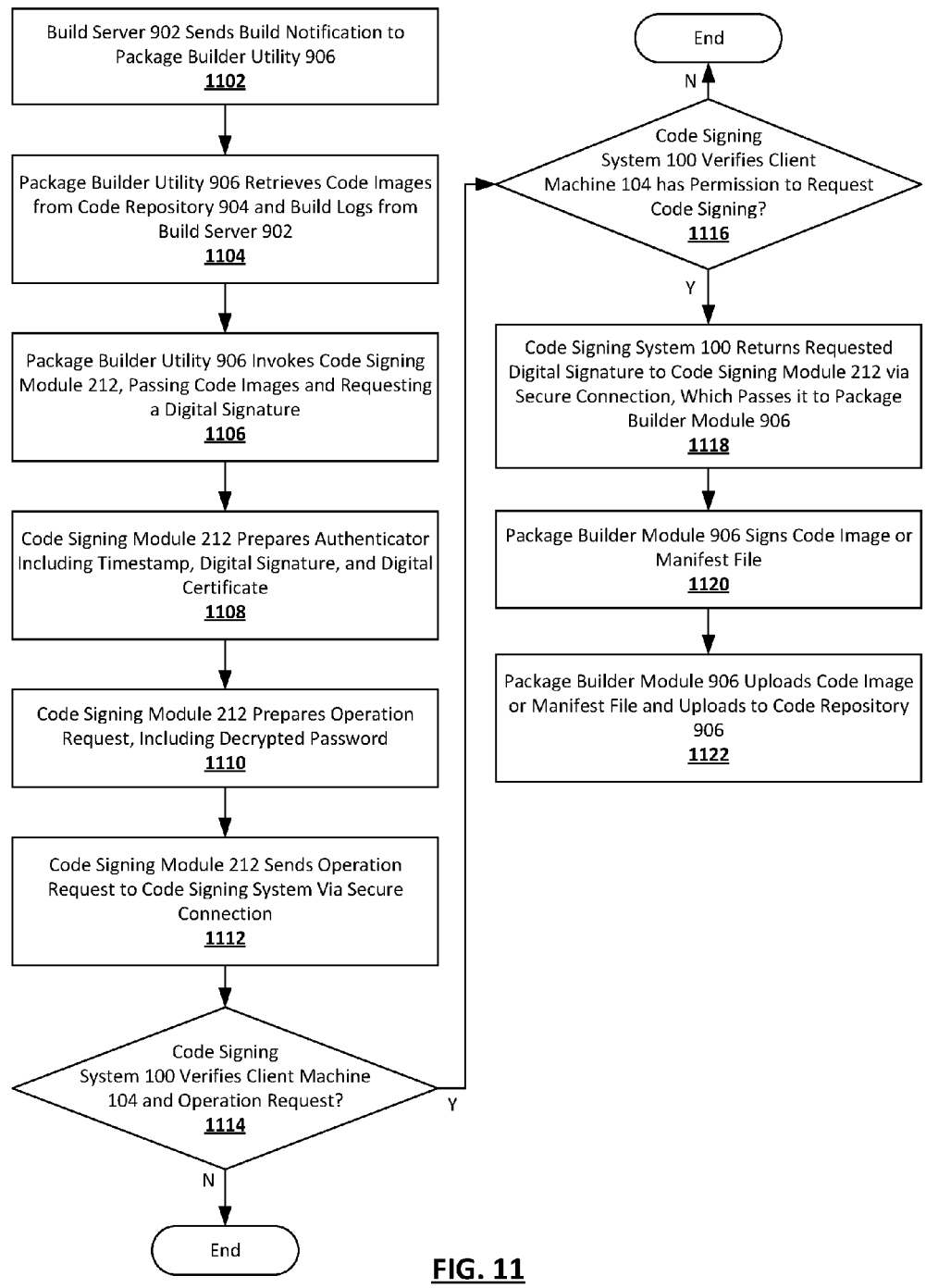
FIG. 11 depicts a second exemplary process for signing a code image or manifest file with a package builder utility, within the operating environment shown in FIG. 9.
Figure 12:
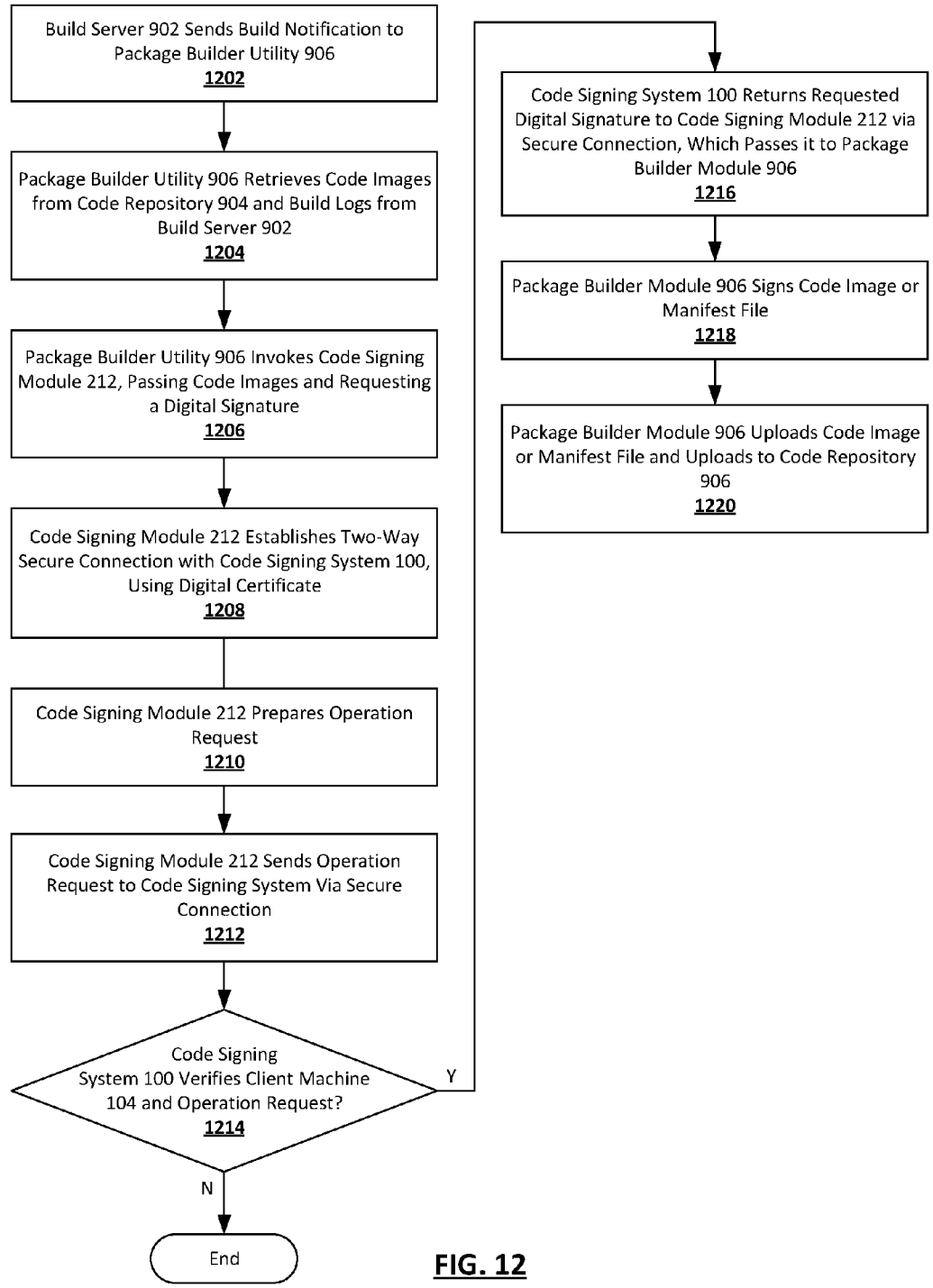
FIG. 12 depicts a third exemplary process for signing a code image or manifest file with a package builder utility, within the operating environment shown in FIG. 9.

The package builder utility 906 can maintain a copy of retrieved build logs for later reference and/or auditing. By way of a non-limiting example, if a code image signed through one of the processes described below with reference to FIGS. 10-12 is later discovered to have a security vulnerability, an associated build log can be consulted to determine which source code modules were used to compile the code image. Corresponding version histories for each source code module described in a build log can also be maintained at the build server 902 and/or package builder utility 906, such that the identity of a user who checked in the changes to a source code module that introduced security vulnerabilities can be determined, even though the build process and/or code signing process can be automated without direct human interaction as described herein.

When the build notification lists a single unsigned code image, the package builder utility 906 can be configured to retrieve the unsigned code image from the code repository 904 based on a file identifier in the build notification, and pass the code image to the code signing module 212 so that the code signing module 212 can request a digital signature for the code image from the code signing system 100 as described above.

When the build notification lists multiple unsigned code images, the package builder utility 906 can be configured to retrieve them and generate a manifest file that includes hashes of each of the unsigned code images. In this scenario, the package builder utility 906 can pass the manifest file to the code signing module 212 so that the code signing module 212 can request a digital signature for the manifest file from the code signing system 100.

In some embodiments or situations, the package builder utility 906 can modify an unsigned code image before passing it to the code signing module 212, such as by adding a header, footer, version information, and/or any other information to the code image. In some embodiments, target devices on which the code image is intended to be loaded can expect such headers, footers, or other information, and can reject the code image if the expected information is not present on even a signed code image.

The package builder utility 906 can further be configured to receive a digital signature from the code signing module 212, after the code signing module 212 requested and received the digital signature from the code signing system 100. When a build notification lists a single unsigned code image, the package builder utility 906 can combine the received digital signature with an original or modified unsigned code image, to create a signed code image. When the build notification lists multiple unsigned code images, the package builder utility 906 can combine the received digital signature with a manifest file, to create a signed manifest file.

The package builder utility 906 can upload signed code images and/or signed manifest files to the code repository 904 and inform the build server 902 and/or human users via email or other messages that the signed code images and/or signed manifest files are available at the code repository 904, such that they can be loaded and executed on target devices.

FIG. 10 depicts a first exemplary process for signing a code image or manifest file with a package builder utility 906, within the operating environment shown in FIG. 9.

At step 1002, the build server 902 can send a build notification to the package builder utility 906 after one or more new unsigned code images have been generated and stored at the code repository 904. In some embodiments or situations, the build server 902 can be configured to build and/or compile new code images automatically, such as at a particular time of day, and/or after new or updated source code modules are submitted to the build server 902 by software developers. When the build server 902 finishes generating one or more new code images, it can store the code images at the code repository 904, save build logs associated with the new code images, and send a build notification to the package builder utility 906 that indicates where the package builder utility 906 can access the code images and build logs.

At step 1004, after the package builder utility 906 receives a build notification, the package builder utility 906 can use URLs or other file identifiers in the build notification to retrieve the code images from the code repository 904 and retrieve the build logs from the build server 902. The package builder utility 906 can archive its copy of the build logs for later reference and/or auditing.

In some embodiments or situations, such as when the build notification received during step 1004 listed multiple unsigned code images, the package builder utility 906 can retrieve the code images and build logs associated with all of the code images identified in the build notification. In these embodiments, the package builder utility 906 can generate hashes for each of the code images, and create a manifest file that includes those hashes.

In some embodiments or situations, such as when the build notification received during step 1004 listed a single unsigned code image, the package builder utility 906 can retrieve that code image and its associated build log. In some embodiments or situations, the package builder utility 906 can modify the code image by adding a header, footer, version identifier, or other information prior to passing the code image to the code signing module 212.

At step 1006, the package builder utility 906 can invoke the code signing module 212 and pass an unsigned code image, or an unsigned manifest file that includes hashes of multiple unsigned code images, to the code signing module 212 along with instructions indicating that the code signing module 212 should request a digital signature for the code image or manifest file in an operation request to the code signing system 100. In some embodiments, the package builder utility 906 can specify to the code signing system 100 a type of digital signature format to request. By way of a non-limiting example, the package builder utility 906 can request a PKCS#1 digital signature for a single code image, or any other type of digital signature. By way of another non-limiting example, the package builder utility 906 can request a PKCS#7 digital signature with a cryptographic message syntax (CMS) for a manifest file, or any other type of digital signature.

The package builder utility 906 can have access to a copy of an encrypted password for the machine client 104, and can pass or identify that encrypted password to the code signing module 212. In some embodiments, the code signing module 212 can decrypt the encrypted password using a cryptographic key stored on a hardware cryptographic token 216 connected to the machine client 104 as described above. In other embodiments, the code signing module 212 can decrypt the encrypted password using a cryptographic key stored elsewhere on the machine client 104.

At step 1008, the code signing module 212 can prepare an operation request. In some embodiments or situations, such as when the build notification received during step 1004 listed a single unsigned code image, the operation request can comprise a user identifier associated with the machine client 104, the decrypted password, a hash of an original or modified unsigned code image, and a request for a digital signature. In other embodiments or situations, such as when the build notification received during step 1004 listed multiple unsigned code images, the operation request can comprise a user identifier associated with the machine client 104, the decrypted password, an unsigned manifest file, and a request for a digital signature. As discussed above, the user identifier in the operation request can be an IP address associated with the machine client 104, such as an IPv4 or IPv6 address. In some embodiments, the code signing module 212 retrieve the user identifier from a hardware cryptographic token 216 connected to the machine client 104. In alternate embodiments, the code signing module 212 can retrieve a static IP address intended for the machine client 104 from memory, and use that IP address as the user identifier in the operation request.

At step 1010, the code signing module 212 can send the operation request to the code signing system 100 over a secure connection, such as an SSL or TLS connection.

At step 1012, the code signing system 100 can attempt to authenticate the machine client 104 and verify the operation request, substantially similarly to steps in the process depicted in FIG. 6. The code signing system 100 can verify the user identifier and decrypted password, such as with a user database 214. The code signing system 100 can verify that the machine client 104 has been authorized to request code signing in the requested format and with the specific signing key for a specified configuration, such as by checking a permissions set retrieved from a permissions database 218. If the code signing system 100 does not authenticate the machine client 104 and verify the operation request, the process can end. However, if the code signing system 100 does authenticate the machine client 104 and verify the operation request, the process can move to step 1014.

At step 1014, the code signing system 100 can generate the requested digital signature, and return the digital signature to the code signing module 212 over the secure connection. The code signing module 212 can pass the digital signature to the package builder utility 906.

In embodiments or situations in which the build notification received during step 1004 listed a single unsigned code image, the package builder utility 906 at step 1016 can combine the digital signature received during step 1014 with the original or modified code image, to create a signed code image. In other embodiments or situations in which the build notification received during step 1004 listed multiple unsigned code image, the package builder utility 906 at step 1016 can combine the digital signature received during step 1014 with the manifest file to create a signed manifest file that lists hashes of multiple code images.

At step 1018, the package builder utility 906 can upload the signed code image or signed manifest file to the code repository 904. The package builder utility 906 can also inform the build server and/or human users that the signed code image or signed manifest file is ready for use. By way of a non-limiting example, the package builder utility 906 can be configured to send emails to designated human users when the signed code image or signed manifest file has been stored at the code repository 904.

In embodiments or situations when a signed code image is uploaded to the code repository 904, the signed code image can later be retrieved from the code repository 904 and be loaded onto target devices. In embodiments or situations when a signed manifest file is uploaded to the code repository 904, the signed manifest file can later be retrieved from the code repository 904 and be loaded onto target devices, along with unsigned code images associated with the hashes in the signed manifest file. A target device can use the signed manifest file to verify the integrity and origin of the unsigned code images when it uses any or all of them during its operation.

FIG. 11 depicts a second exemplary process for signing a code image or manifest file with a package builder utility 906, within the operating environment shown in FIG. 9.

At step 1102, the build server 902 can send a build notification to the package builder utility 906 after one or more new unsigned code images have been generated and stored at the code repository 904. In some embodiments or situations, the build server 902 can be configured to build and/or compile new code images automatically, such as at a particular time of day, and/or after new or updated source code modules are submitted to the build server 902 by software developers. When the build server 902 finishes generating one or more new code images, it can store the code images at the code repository 904, save build logs associated with the new code images, and send a build notification to the package builder utility 906 that indicates where the package builder utility 906 can access the code images and build logs.

At step 1104, after the package builder utility 906 receives a build notification, the package builder utility 906 can use URLs or other file identifiers in the build notification to retrieve the code images from the code repository 904 and retrieve the build logs from the build server 902. The package builder utility 906 can archive its copy of the build logs for later reference and/or auditing.

In some embodiments or situations, such as when the build notification received during step 1104 listed multiple unsigned code images, the package builder utility 906 can retrieve the code images and build logs associated with all of the code images identified in the build notification. In these embodiments, the package builder utility 906 can generate hashes for each of the code images, and create a manifest file that includes those hashes.

In some embodiments or situations, such as when the build notification received during step 1104 listed a single unsigned code image, the package builder utility 906 can retrieve that code image and its associated build log. In some embodiments or situations, the package builder utility 906 can modify the code image by adding a header, footer, version identifier, or other information prior to passing the code image to the code signing module 212.

At step 1106, the package builder utility 906 can invoke the code signing module 212 and pass an unsigned code image, or an unsigned manifest file that includes hashes of multiple unsigned code images, to the code signing module 212 along with instructions indicating that the code signing module 212 should request a digital signature for the code image or manifest file in an operation request to the code signing system 100. In some embodiments, the package builder utility 906 can specify to the code signing system 100 a type of digital signature format to request. By way of a non-limiting example, the package builder utility 906 can request a PKCS#1 digital signature for a single code image, or any other type of digital signature. By way of another non-limiting example, the package builder utility 906 can request a PKCS#7 digital signature with a cryptographic message syntax (CMS) for a manifest file, or any other type of digital signature.

At step 1108, the code signing module 212 can prepare an authenticator, a data blob comprising a current timestamp signed with a private key, a digital signature, and a digital certificate comprising the machine client's user identifier. In some embodiments, the code signing module 212 can sign the timestamp using a private key 306 stored on a hardware cryptographic token 216 connected to the machine client 104 as described above, and can also retrieve the digital certificate 308 from the hardware cryptographic token 216 to be included in the authenticator. In other embodiments, the code signing module 212 can use a private key and/or digital certificate stored elsewhere on the machine client 104. As discussed above, the user identifier in the authenticator can be an IP address associated with the machine client 104, such as an IPv4 or IPv6 address.

At step 1110, the code signing module 212 can prepare an operation request. In some embodiments or situations, such as when the build notification received during step 1104 listed a single unsigned code image, the operation request can comprise the authenticator generated during step 1108, a hash of an original or modified unsigned code image, and a request for a digital signature. In other embodiments or situations, such as when the build notification received during step 1104 listed multiple unsigned code images, the operation request can comprise the authenticator, an unsigned manifest file, and a request for a digital signature.

At step 1112, the code signing module 212 can send the operation request to the code signing system 100 over a secure connection, such as an SSL or TLS connection.

At step 1114, the code signing system 100 can attempt to authenticate the machine client 104 and verify the operation request, substantially similarly to steps in the process depicted in FIG. 7. The code signing system 100 can verify the authenticator's digital signature and digital certificate. In some embodiments, the code signing system 100 can further verify the timestamp to confirm that it is within a predetermined time window. If the code signing system 100 does not authenticate the machine client 104 and verify the operation request, the process can end. However, if the code signing system 100 does authenticate the machine client 104 and verify the operation request, the process can move to step 1116.

At step 1116, the code signing system 100 can verify that the machine client 104 has been authorized to request code signing in the requested format and with the specific signing key for a specified configuration, such as by checking a permissions set retrieved from a permissions database 218 associated with the user identifier included in the digital certificate received as part of the operation request. If the code signing system 100 does not verify that the machine client 104 has permission to code signing in the requested format and with the specific signing key for a specified configuration, the process can end. However, if the code signing system 100 does verify that the machine client 104 has permission to request code signing in the requested format, the process can move to step 1118.

At step 1118, the code signing system 100 can generate the requested digital signature, and return the digital signature to the code signing module 212 over the secure connection. The code signing module 212 can pass the digital signature to the package builder utility 906.

In embodiments or situations in which the build notification received during step 1104 listed a single unsigned code image, the package builder utility 906 at step 1120 can combine the digital signature received during step 1118 with the original or modified code image, to create a signed code image. In other embodiments or situations in which the build notification received during step 1104 listed multiple unsigned code images, the package builder utility 906 at step 1120 can combine the digital signature received during step 1118 with the manifest file to create a signed manifest file that lists hashes of multiple code images.

At step 1122, the package builder utility 906 can upload the signed code image or signed manifest file to the code repository 904. The package builder utility 906 can also inform the build server and/or human users that the signed code image or signed manifest file is ready for use. By way of a non-limiting example, the package builder utility 906 can be configured to send emails to designated human users when the signed code image or signed manifest file has been stored at the code repository 904.

In embodiments or situations when a signed code image is uploaded to the code repository 904, the signed code image can later be retrieved from the code repository 904 and be loaded onto target devices. In embodiments or situations when a signed manifest file is uploaded to the code repository 904, the signed manifest file can later be retrieved from the code repository 904 and be loaded onto target devices, along with unsigned code images associated with the hashes in the signed manifest file. A target device can use the signed manifest file to verify the integrity and origin of the unsigned code images when it uses any or all of them during its operation.

FIG. 12 depicts a third exemplary process for signing a code image or manifest file with a package builder utility 906, within the operating environment shown in FIG. 9.

At step 1202, the build server 902 can send a build notification to the package builder utility 906 after one or more new unsigned code images have been generated and stored at the code repository 904. In some embodiments or situations, the build server 902 can be configured to build and/or compile new code images automatically, such as at a particular time of day, and/or after new or updated source code modules are submitted to the build server 902 by software developers. When the build server 902 finishes generating one or more new code images, it can store the code images at the code repository 904, save build logs associated with the new code images, and send a build notification to the package builder utility 906 that indicates where the package builder utility 906 can access the code images and build logs.

At step 1204, after the package builder utility 906 receives a build notification, the package builder utility 906 can use URLs or other file identifiers in the build notification to retrieve the code images from the code repository 904 and retrieve the build logs from the build server 902. The package builder utility 906 can archive its copy of the build logs for later reference and/or auditing.

In some embodiments or situations, such as when the build notification received during step 1204 listed multiple unsigned code images, the package builder utility 906 can retrieve the code images and build logs associated with all of the code images identified in the build notification. In these embodiments, the package builder utility 906 can generate hashes for each of the code images, and create a manifest file that includes those hashes.

In some embodiments or situations, such as when the build notification received during step 1204 listed a single unsigned code image, the package builder utility 906 can retrieve that code image and its associated build log. In some embodiments or situations, the package builder utility 906 can modify the code image by adding a header, footer, version identifier, or other information prior to passing the code image to the code signing module 212.

At step 1206, the package builder utility 906 can invoke the code signing module 212 and pass an unsigned code image, or an unsigned manifest file that includes hashes of multiple unsigned code images, to the code signing module 212 along with instructions indicating that the code signing module 212 should request a digital signature for the code image or manifest file in an operation request to the code signing system 100. In some embodiments, the package builder utility 906 can specify to the code signing system 100 a type of digital signature format to request. By way of a non-limiting example, the package builder utility 906 can request a PKCS#1 digital signature for a single code image, or any other type of digital signature. By way of another non-limiting example, the package builder utility 906 can request a PKCS#7 digital signature with a cryptographic message syntax (CMS) for a manifest file, or any other type of digital signature.

At step 1208, the code signing module 212 can establish a two-way secure connection with the code signing system 100, such as an SSL connection, a TLS connection, or any other type of secure connection such as an IPsec connection. In this embodiment, the secure connection can be mutually authenticated based on cryptographic keys and/or digital certificates from both ends of the connection. In this embodiment, the digital certificate 308 and/or private key 306 from the hardware cryptographic token 216 or elsewhere on the machine client 104 can be provided by the code signing module 212 as part of the connection handshake. The code signing system 100 can extract and save the machine client's user identifier and digital certificate 308 from the exchange of data performed to establish the secure connection.

At step 1210, the code signing module 212 can prepare an operation request. In some embodiments or situations, such as when the build notification received during step 1204 listed a single unsigned code image, the operation request can comprise a hash of an original or modified unsigned code image, and a request for a digital signature. In other embodiments or situations, such as when the build notification received during step 1204 listed multiple unsigned code images, the operation request can comprise an unsigned manifest file, and a request for a digital signature.

At step 1212, the code signing module 212 can pass the operation request to the code signing system 100 over the secure connection established during step 1208.

At step 1214, the code signing system 100 can attempt to authenticate the machine client 104 and verify the operation request, substantially similarly to steps in the process depicted in FIG. 8. The code signing system 100 can verify that the machine client 104 has been authorized to request code signing in the requested format and with the specific signing key for a specified configuration, such as by checking a permissions set retrieved from a permissions database 218 that is associated with the user identifier extracted by the code signing system 100 when the secure connection was established in step 1208. If the code signing system 100 does not authenticate the machine client 104 and verify the operation request, the process can end. However, if the code signing system 100 does authenticate the machine client 104 and verify the operation request, the process can move to step 1216.

At step 1216, the code signing system 100 can generate the requested digital signature, and return the digital signature to the code signing module 212 over the secure connection. The code signing module 212 can pass the digital signature to the package builder utility 906.

In embodiments or situations in which the build notification received during step 1204 listed a single unsigned code image, the package builder utility 906 at step 1218 can combine the digital signature received during step 1216 with the original or modified code image, to create a signed code image. In other embodiments or situations in which the build notification received during step 1204 listed multiple unsigned code images, the package builder utility 906 at step 1218 can combine the digital signature received during step 1216 with the manifest file to create a signed manifest file that lists hashes of multiple code images.

At step 1220, the package builder utility 906 can upload the signed code image or signed manifest file to the code repository 904. The package builder utility 906 can also inform the build server and/or human users that the signed code image or signed manifest file is ready for use. By way of a non-limiting example, the package builder utility 906 can be configured to send emails to designated human users when the signed code image or signed manifest file has been stored at the code repository 904.

In embodiments or situations when a signed code image is uploaded to the code repository 904, the signed code image can later be retrieved from the code repository 904 and be loaded onto target devices. In embodiments or situations when a signed manifest file is uploaded to the code repository 904, the signed manifest file can later be retrieved from the code repository 904 and be loaded onto target devices, along with unsigned code images associated with the hashes in the signed manifest file. A target device can use the signed manifest file to verify the integrity and origin of the unsigned code images when it uses any or all of them during its operation.

Although the present invention has been described above with particularity, this was merely to teach one of ordinary skill in the art how to make and use the invention. Many additional modifications will fall within the scope of the invention, as that scope is defined by the following claims.

The invention claimed is:

1. A code signing system, comprising:
a frontend server operating a web service configured to exchange data automatically over a network with a code signing module running on a remote machine client, and a web portal configured to exchange data over said network with a manually operated connection for a remote user client; and
a backend server in data communication with said frontend server, said backend server being in data communication with a permissions database, said permissions database storing permission sets associated with authorized users,
wherein said frontend server is configured to receive an operation request message from said code signing module that comprises a request for a cryptographic operation and user credentials retrieved by said code signing module from a hardware cryptographic token connected to said machine client,
wherein said frontend server is configured to authenticate said machine client or the remote user client as an authorized user based at least in part on the user credentials received from said code signing module, wherein said user credentials comprise a private key and a corresponding digital certificate retrieved by said code signing module from said hardware cryptographic token, and
wherein said backend server is configured to perform the cryptographic operation requested in said operation request and return a result of the cryptographic operation to said machine client or the remote user client via said frontend server when said frontend server authenticates said machine client or the remote user client as an authorized user and the cryptographic operation is within a permission set associated with said machine client or the remote user client in said permissions database,
wherein said frontend server operates a GUI-based web portal as the web portal through which the remote user client can connect manually over a connection to the network to request the cryptographic operation, and
wherein said frontend server further operates the web portal interface for connection with the remote machine client to request the cryptographic operation.

2. The system of claim 1, wherein said operation request further comprises a code image and the cryptographic operation requested in said operation request is a code signing request.

3. The system of claim 2, wherein said backend server performs said code signing request by invoking a cryptographic key protected by a hardware security module coupled with said backend server, and said result is a signed code image.

4. The system of claim 1, wherein said user credentials comprises an IP address associated with said machine client, a password decrypted from an encrypted password by said code signing module using a cryptographic key stored on said hardware cryptographic token.

5. The system of claim 4, wherein said frontend server authenticates said machine client as an authorized user when said IP address matches an IP address associated with said password in a user database accessible by said frontend server.

6. The system of claim 1, wherein said operation request further comprises a signed authenticator comprising an IP address associated with said machine client, a timestamp, and a requested operation, and wherein said signed authenticator is signed using said private key protected on said hardware cryptographic token.

7. The system of claim 6, wherein said frontend server authenticates said machine client as an authorized user when said digital certificate does not appear on a certificate revocation list, said timestamp is within a predefined time window, and the signature of said signed authenticator is verified using said digital certificate.

8. The system of claim 6, wherein said frontend server is configured to receive said operation request from said code signing module over a one-way Secure Sockets Layer connection.

9. The system of claim 1, wherein said user credentials comprises a digital certificate retrieved by said code signing module from said hardware cryptographic token, wherein said operation request further comprises an IP address associated with said machine client, and wherein said frontend server is configured to receive said operation request from said code signing module over a two-way Secure Sockets Layer connection.

10. A method of performing remotely requested cryptographic operations, comprising:
providing a code signing system comprising a frontend server and a backend server, wherein said frontend server runs a web portal configured to exchange data with a manually operated remote user clients and a web service configured to exchange data automatically with a remote machine clients;
receiving an operation request message at said frontend server via said web service from a code signing module running on the remote machine client or from the remote user client, said operation request comprising a request for a cryptographic operation, an IP address associated with said machine client or with the remote user client with the operation request message authorized by the code signing module using a private key and a hardware cryptographic token;
passing said IP address from said frontend server to said backend server and retrieving a permissions set associated with said IP address from a permissions database at said backend server;
performing said cryptographic operation at said backend server when said cryptographic operation is within said permissions set;
returning a result of said cryptographic operation from said backend server to said frontend server; and
returning said result from said frontend server to said code signing module on said machine client or the remote user client via said web service.

11. The method of claim 10, wherein said operation request further comprises a code image and the cryptographic operation requested in said operation request is a code signing request.

12. The method of claim 11, wherein said backend server performs said code signing request by invoking a cryptographic key protected by a hardware security module coupled with said backend server, and said result is a signed code image.

* * * * *